(12) United States Patent
Miyata

(10) Patent No.: US 8,630,183 B2
(45) Date of Patent: Jan. 14, 2014

(54) PACKET TRANSFER SYSTEM

(75) Inventor: Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1194 days.

(21) Appl. No.: 12/147,813

(22) Filed: Jun. 27, 2008

(65) Prior Publication Data

US 2009/0092051 A1    Apr. 9, 2009

(30) Foreign Application Priority Data

Oct. 3, 2007 (JP) .................................. 2007-259941

(51) Int. Cl.
 *G01R 31/08* (2006.01)
(52) U.S. Cl.
 USPC ........................................................ 370/236
(58) Field of Classification Search
 USPC ........................................................ 370/236
 See application file for complete search history.

(56) References Cited

U.S. PATENT DOCUMENTS

| 6,947,428 | B1 * | 9/2005 | Andersson et al. .......... 370/395.5 |
| 2001/0055285 | A1 * | 12/2001 | Tomoike ...................... 370/328 |
| 2003/0185207 | A1 * | 10/2003 | Nakahara ..................... 370/389 |
| 2004/0264509 | A1 * | 12/2004 | Hu et al. ...................... 370/503 |
| 2006/0056422 | A1 | 3/2006 | Berkvens |
| 2007/0044142 | A1 * | 2/2007 | Yoon et al. ...................... 726/3 |

FOREIGN PATENT DOCUMENTS

| JP | 2005-064936 | 3/2005 |
| JP | 2007-335945 | 12/2007 |
| JP | 2008-113260 | 5/2008 |
| WO | 2004084496 | 9/2004 |

OTHER PUBLICATIONS

RFC2284, L. Blunk, et al, "PPP Extensible Authentication Protocol (EAP)", Mar. 1998, pp. 1-14.
RFC2516, L. Mamkos, et al, A Method for Transmitting PPP Over Ethernet (PPPoE), Feb. 1999, pp. 1-11.

* cited by examiner

*Primary Examiner* — Mark Rinehart
*Assistant Examiner* — Maharishi Khirodhar
(74) *Attorney, Agent, or Firm* — Brundidge & Stanger, P.C.

(57) ABSTRACT

A gateway selector and a load distribution management device are provided between a user terminal and plural gateway devices. Of response packets received from the plural gateway devices, the gateway selector selects a response packet from a gateway device with a higher priority, according to the priority in a load distribution management table of the load distribution management device. Then, the gateway selector transfers the selected response packet to the user terminal, while discarding a response packet from another gateway device. In this way, it is possible to construct a redundant configuration of the gateway devices, independent of user terminal implementation.

10 Claims, 16 Drawing Sheets

| TERMINAL PORT (1521) | TERMINAL MAC (1522) | GW PORT (1523) | GW MAC /*GW MAC-SA (1524) | STATUS (1525) | TIMER VALUE (ms) (1526) |
|---|---|---|---|---|---|
| 1 | 00-00-00-00-00-01 | 4 | 00-00-00-22-22-01 | 999 | — |
| ⋮ | ⋮ | ⋮ | ⋮ | ⋮ | ⋮ |
| m | 00-00-00-00-00-02 | — | — | PADO WAITING | 3,000 |

ENm

FIG.6B

| TERMINAL PORT | TERMINAL MAC | GW PORT | GW MAC /*GW MAC-SA | STATUS | TIMER VALUE (ms) |
|---|---|---|---|---|---|
| 1 | 00-00-00-00-00-01 | 4 | 00-00-00-22-22-01 | 999 | — |
| ⋮ | ⋮ | ⋮ | ⋮ | ⋮ | ⋮ |
| m | 00-00-00-00-00-02 | n | 00-00-00-22-22-02 | PADO WAITING | 2,980 |

ENm

FIG.6C

| TERMINAL PORT | TERMINAL MAC | GW PORT | GW MAC /*GW MAC-SA | STATUS | TIMER VALUE (ms) |
|---|---|---|---|---|---|
| 1 | 00-00-00-00-00-01 | 4 | 00-00-00-22-22-01 | 999 | — |
| ⋮ | ⋮ | ⋮ | ⋮ | ⋮ | ⋮ |
| m | 00-00-00-00-00-02 | n | 00-00-00-22-22-02 | PADO WAITING | 2,975 |
|  |  | 4 | 00-00-00-22-22-01 |  |  |

ENm

FIG.6D

| TERMINAL PORT | TERMINAL MAC | GW PORT | GW MAC /*GW MAC-SA | STATUS | TIMER VALUE (ms) |
|---|---|---|---|---|---|
| 1 | 00-00-00-00-00-01 | 4 | 00-00-00-22-22-01 | 999 | — |
| ⋮ | ⋮ | ⋮ | ⋮ | ⋮ | ⋮ |
| m | 00-00-00-00-00-02 | 4 | 00-00-00-22-22-01 | PADS WAITING | 3,000 |

ENm

FIG.6E

| TERMINAL PORT | TERMINAL MAC | GW PORT | GW MAC /*GW MAC-SA | STATUS | TIMER VALUE (ms) |
|---|---|---|---|---|---|
| 1 | 00-00-00-00-00-01 | 4 | 00-00-00-22-22-01 | 999 | — |
| ⋮ | ⋮ | ⋮ | ⋮ | ⋮ | ⋮ |
| m | 00-00-00-00-00-02 | 4 | 00-00-00-22-22-01 | 1,000 | — |

ENm

FIG.6F

| TERMINAL PORT | TERMINAL MAC | GW PORT | GW MAC /*GW MAC-SA | STATUS | TIMER VALUE (ms) |
|---|---|---|---|---|---|
| 1 | 00-00-00-00-00-01 | 4 | 00-00-00-22-22-01 | 999 | — |
| ⋮ | ⋮ | ⋮ | ⋮ | ⋮ | ⋮ |
|  |  |  |  |  |  |

FIG.7

| PORT NO. (1531) | GW CONNECTION FLAG (1532) | MAC ADDRESS (1533) |
|---|---|---|
| 1 | 0 | 00-00-00-00-00-01 |
|  |  | : |
| : | : | : |
| 4 | 1 | 00-00-00-22-22-01 |
|  |  | : |
| 5 | 0 | 00-00-00-22-22-03 |
|  |  | : |
| : | : | : |
| 8 | 0 | 00-00-00-00-00-03 |
|  |  | : |
| : | : | : |
| m | 0 | 00-00-00-00-00-02 |
|  |  | : |
| : | : | : |
| n | 1 | 00-00-00-22-22-02 |
|  |  | : |
| : | : | : |

| GW MAC | MANAGEMENT PRIORITY | SELECTION PRIORITY | CONNECTION RATE(%) | MAXIMUM CONNECTIONS | NUMBER OF CONNECTIONS |
|---|---|---|---|---|---|
| 00-00-00-22-22-01 | 1 | 1 | 19.98 | 5,000 | 999 |
| 00-00-00-22-22-02 | 1 | 2 | 19.98 | 5,000 | 999 |
| | | | | | |

| GW MAC | MANAGEMENT PRIORITY | SELECTION PRIORITY | CONNECTION RATE(%) | MAXIMUM CONNECTIONS | NUMBER OF CONNECTIONS |
|---|---|---|---|---|---|
| 00-00-00-22-22-01 | 1 | 2 | 20.00 | 5,000 | 1,000 |
| 00-00-00-22-22-02 | 1 | 1 | 19.98 | 5,000 | 999 |
| | | | | | |

PACKET TRANSFER SYSTEM

CLAIM OF PRIORITY

The present application claims priority from Japanese patent application serial no. 2007-259941, filed on Oct. 3, 2007, the content of which is hereby incorporated by reference into this application.

BACKGROUND OF THE INVENTION

The present invention relates to a packet transfer system forming an Internet access network. More particularly, the present invention relates to a packet transfer system with a gateway load distribution function for selecting one of plural gateway devices connected to an Internet relay network, and for connecting a user terminal to the relay network through the selected gateway device.

Currently, authentication-based high-speed Internet connection service is provided. This service connects a user terminal to an authentication server via a high speed access line such as an asymmetric digital subscriber line (ADSL), fiber to the home (FTTH), or wireless LAN, and connects the user terminal to the Internet only when the user terminal has succeeded in authentication. In the authentication-based high-speed Internet connection service, the user terminal is connected to a relay network operated by an Internet service provider (ISP), for example, through a gateway device that terminates a high-speed access network such as a broadband access server (BAS). When the user terminal is a point to point protocol over Ethernet (PPPoE) terminal specified in RFC 2516, the BAS terminates connection protocols, PPPoE and PPP, with the user terminal. Then, the BAS transfers a layer-3 packet to the relay network.

Recently, in the above-mentioned high-speed access networks, IP telephone service has been started. This leads to a demand for high quality in the high-speed access network that is comparable to the quality of the existing telephone. To meet this demand, it is necessary to reduce service downtime in a BAS having significant influence on a network when a failure occurs. Thus, there is constructed an access network in which a connection path between each user terminal and a relay network is made redundant by providing plural redundant BASs at the gates of the relay network. In such an access network including plural redundant BASs, it is desirable that the connection load of each BAS can be appropriately distributed in the future.

In addition to the above layer-3 Internet connection service, an authentication-based connection service at a layer-2 level has also been provided recently. In the layer-2 level authentication-based connection service, user authentication is performed using PPP extensible authentication protocol (EAP) in IEEE 802.1X specified in RFC 2284. In this case, the relay network is constructed by Ethernet. EAP provides user authentication by communicating an EAP over LAN (EAPOL) packet between a supplicant (an authentication requester, namely, a user terminal) and an authenticator (an authentication provider, namely, a gateway device). The authenticator receives a packet from an authenticated user terminal, and transfers the packet as a layer-2 packet to the relay network.

In the layer-2 Internet connection service using IEEE 802.1X, for example, in EAP transfer phase after completion of EAP authentication phase, each user terminal (supplicant) requests an IP address to a dynamic host configuration protocol (DHCP) server operated by an ISP, and receives an assignment of the IP address to be used by the user terminal. IEEE 802.1X is based on a one-to-one connection between the supplicant and the gateway device. Thus, the gateway device as the authenticator should have plural connection ports according to the number of supplicants to be accommodated.

However, it is also possible to accommodate plural supplicants in one connection port of the authenticator. In this case, plural user terminals are accommodated in the authenticator through layer 2 switch (L2SW). Each user terminal applies a special multicast MAC address ("01-80-C2-00-00-03") to an EAPOL packet so that the EAPOL packet can pass through the L2SW.

Also in the Internet connection service at the layer 2 level, similarly to the case of the connection service at the layer 3 level as described above, redundancy and load distribution of the gateway devices (authenticators) are demanded in connection with the provision of IP telephone service.

JP-A No. 2005-064936 proposes a PPPoE distribution system and method, including plural broadband remote access servers (BRASs) each connected to plural ISPs, and a PPPoE session management device provided between the plural BRASs and a PPPoE terminal. Upon reception of a PPPoE active discovery initiation (PADI) packet from the PPPoE terminal, the PPPoE session management device selects the appropriate BRAS to which the PPPoE terminal should be connected. Then, the PADI packet is transferred to the selected BRAS.

In order to provide an IP telephone service to each user terminal through the relay network, it is necessary to enhance the communication performance of the access network and relay network, up to a level comparable to that of the existing telephone network. As described above, the layer-3 connection service using PPPoE can construct an access network with redundant BAS configuration.

In the network of redundant BAS configuration, plural BASs transmit PPPoE active discovery offer (PADO) packets, in response to a PADI packet which is broadcast from a PPPoE terminal. The PPPoE terminal selects one of the source BASs of the PADO packets. Then, the PPPoE terminal performs the following communication control procedures from transmission of a PPPoE active discovery request (PADR) packet with the selected BAS, according to PPPoE connection procedure.

However, the selection of BAS in the PPPoE terminal depends on the reception timing of PADO packet, or the BAS selection algorithm implemented in each PPPoE terminal. For this reason, in the method of selecting BAS by the PPPoE terminal, the load distribution of plural redundant BASSs is not uniquely controlled on the side of the ISP (or carrier) that operates the relay network. This makes it difficult to provide load distribution-type BAS management that determines a destination BAS of the PPPoE terminal so that the connection load is equally distributed among plural BASs. It is also difficult to provide BAS operation in which plural redundant BASs are divided into working system and protection system.

According to the PPPoE session distribution system proposed in JP-A No. 2005-064936, the load is distributed to plural BRASs by PPPoE session management. A PPPoE session management device of JP-A No. 2005-064936 includes a BRAS IP address management table storing the number of remaining IP addresses of each ISP that is held by each BRAS, and an ISP PPP session correspondence table showing the correspondence between a terminal MAC address and a destination ISP. Upon reception of a broadcasted PADI packet from a user terminal, the PPPoE session management device identifies a destination ISP by referring to the ISP PPP session correspondence table, and selects a BRAS with the largest number of remaining IP addresses for the destination ISP by referring to the BRAS IP address management table. Then, the PADI packet converted into a unicast packet is transmitted to the selected BRAS.

However, in JP-A No. 2005-064936, upon termination of the PPPoE session, each BRAS reports the numbers of PPPoE sessions and of remaining IP addresses currently held by the BRAS, to the PPPoE session management device. Then, the PPPoE session management device updates the BRAS IP address management table based on the data reported from each BRAS, in order to optimize the content of the BRAS IP address management table that the PPPoE session management device refers to. Thus, in the load distribution method of JP-A No. 2005-064936, each BRAS should have an additional function for reporting the number of PPPoE sessions and the number of remaining IP addresses. Further, in a network configuration in which plural PPPoE session management devices are connected to each BRAS, the number of PPPoE sessions and the like of each BRAS may not be shared by the PPPoE session management devices. Thus, it is difficult to immediately reflect the latest information such as the number of PPPoE sessions connected by another PPPoE session management device.

Incidentally, the inventors of the present application have proposed, in Japanese Patent Application No. 2006-162074 (JP-A-2007-335945), a network configuration for the connection service at layer 3 using PPPoE (or layer 2 using IEEE802.1X). This network configuration includes a packet transfer device connected to plural user terminals. The packet transfer device multicasts a PADI packet (or EAPOL-Start packet) received from each user terminal, to a relay network. In response to this, plural gateway devices (BASs, or authenticators) transmit PADO (or EAPOL-Request/ID request) packets to the packet transfer device. Then, the packet transfer device only transfers the response packet from a specific gateway device selected from the plural gateway devices, to the user terminal that is the source of connection request.

Further, the present inventors have also proposed a load distribution packet transfer device in Japanese Patent Application No. 2006-295020 (JP-A-2008-113260). In a network configuration in which an access network connected to plural user terminals, and a relay network to the Internet are connected by plural redundant gateway devices (BASs, authenticators and the like), the load distribution packet transfer device can connect a user terminal and a gateway device by distributing the load of the redundant gateway devices, without adding a special function to each gateway device.

With the above described configuration, it is possible to provide redundancy and load distribution control of the gateway devices without changing the function of each gateway device. However, in the above described application, there is no description of load distribution control of redundant gateway devices, in a network configuration in which plural load distribution packet transfer devices are connected to each gateway device, by sharing the user connection information of each packet transfer device.

SUMMARY OF THE INVENTION

The present invention aims at providing a packet transfer system with load distribution function. In a network configuration including plural redundant gateway devices (BASs, authenticators and the like) for connecting an access network to which a user terminal is connected, and a relay network to the Internet, the packet transfer system connects the user terminal with consideration of the load distribution of the gateway devices.

The above aim is achieved by a packet transfer system including: a load distribution packet transfer device provided between a user terminal and plural redundant gateway devices connected to a relay network to the Internet; and a load distribution management device operating in association with the load distribution packet transfer device. The load distribution packet transfer device includes: plural line interfaces for each accommodating a connection line with the user terminal or gateway device; and a protocol processing unit for controlling transfer of user packets and communication control packets among the plural line interfaces. The protocol processing unit performs the following functions: transmitting a packet received from the user terminal requesting to start a connection to the relay network, to the plural gateway devices; giving information of response packets received within a predetermined period of time, in response to the connection start request packet to the load distribution management device; transferring a response packet received from a gateway device selected by the load distribution management device, to the user terminal; and transferring communication control packets and user packets received from the user terminal, to the selected gateway device.

Further, the above aim is achieved by a load distribution packet system including: a load distribution packet transfer device provided between a user terminal and plural redundant gateway devices connected to a relay network to the Internet; and a load distribution management device operating in association with the load distribution packet transfer device. The load distribution management device includes: a line interface for accommodating a connection line with the load distribution packet transfer device; and a load distribution processing unit for providing load distribution control of the gateway devices. The load distribution management device performs the following functions: selecting a higher priority gateway device from a gateway information list notification received from the load distribution packet transfer device, based on a load distribution management table that stores priority information of each gateway device; and, giving the selected gateway device information to the load distribution packet transfer device.

BRIEF DESCRIPTION OF THE DRAWINGS

Preferred embodiments of the present invention will now be described in conjunction with the accompanying drawings, in which:

FIGS. 6A to 6F are views for illustrating a connection management table;

FIG. 7 is a view for illustrating a port management table;

FIGS. 8A and 8B are views for illustrating a load distribution management table;

DESCRIPTION OF THE PREFERRED EMBODIMENTS

Figure 1:
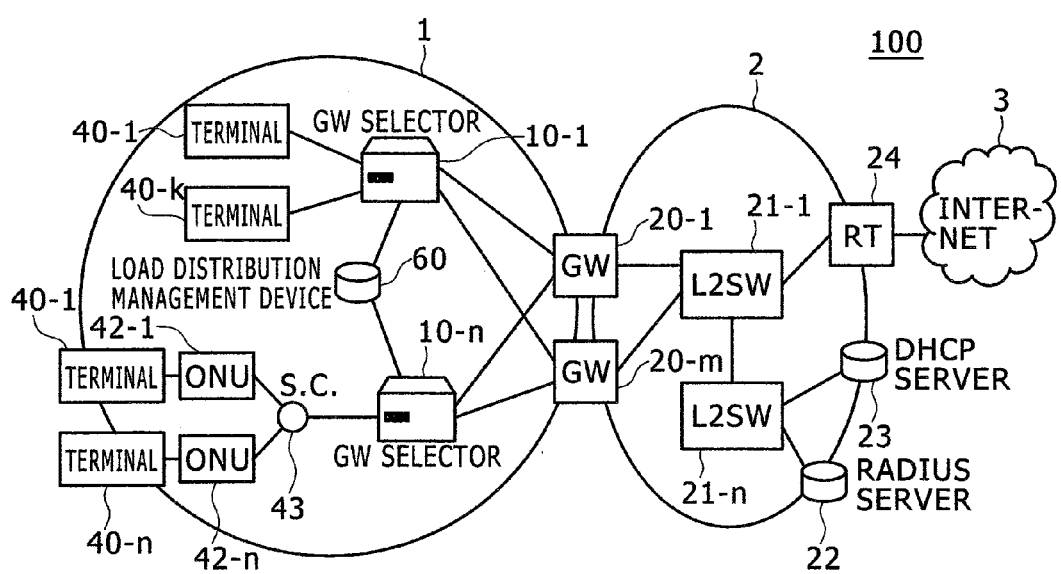
FIG. 1 is a block diagram of a communication network.

In the following, the present invention will be described using examples with reference to the drawings. Like or corresponding parts are denoted by the same reference numerals and the description will not be repeated.

The configuration of a communication network to which a load distribution packet transfer system is applied will be described with reference to FIG. 1. Here, FIG. 1 is a block diagram of a communication network. In FIG. 1, a communication network 100 includes an access network 1, a relay network 2 operated by a carrier or an ISP, and the Internet 3.

The access network 1 is connected to the relay network 2 through gateway (GW) devices 20 (20-1, 20-m) lo having a function for terminating communication frames of different protocols such as IEEE802.1X and PPPoE.

The access network 1 includes: plural terminals 40 each having a session connection function according to a protocol such as IEEE802.1X or PPPoE; plural load distribution packet transfer devices 10 for accommodating the terminals 40; and a load distribution management device 60 for providing load distribution control of the gateway devices 20. Each of the load distribution packet transfer devices 10 is connected to the plural redundant gateway devices 20.

The load distribution packet transfer system includes the load distribution packet transfer devices 10 and the load distribution management device 60. As described below, the load distribution packet transfer device 10 has not only a general L2SW function for transferring a received packet according to the layer 2 header information, but also a gateway selection function for selectively connecting each terminal 40 to one of the plural redundant gateway devices 20. In the following description, the latter function is especially focused on, and the load distribution packet transfer device 10 is referred to as "gateway selector".

Next, the load distribution management device 60 has a function for providing load distribution control according to the gateway identification information given from the load distribution packet transfer devices 10, and for giving the selected gateway device information. Here, the load distribution management device 60 is connected to the access network 1, but it may also be connected to the relay network 2.

In the access network 1, the gateway selector 10-1 accommodates plural terminals 40-1 to 40-k through individual access lines, respectively. While the gateway selector 10-n accommodates plural terminals 40-1 to 40-n through a passive optical network (PON). The PON includes: plural optical network units (ONU) 42; an optical line terminal (OLT) incorporated in the gateway selector 10-n; and an optical fiber network in which one optical fiber accommodated in the OLT is divided into plural branch lines by a star coupler (S.C.) 43.

The relay network 2 includes plural layer 2 switches (L2SWs) 21, a user authentication server (RADIUS server) 22, a DHCP server 23 for delivering an IP address to a user terminal, and a router 24 for connecting the relay network to the Internet 3. The L2SW 21-1 is connected to the router 24 and to a pair of redundant gateway devices (20-1 to 20-m). The RADIUS server 22 and the DHCP server 23 are connected to the L2SW 21-n.

Figure 2:
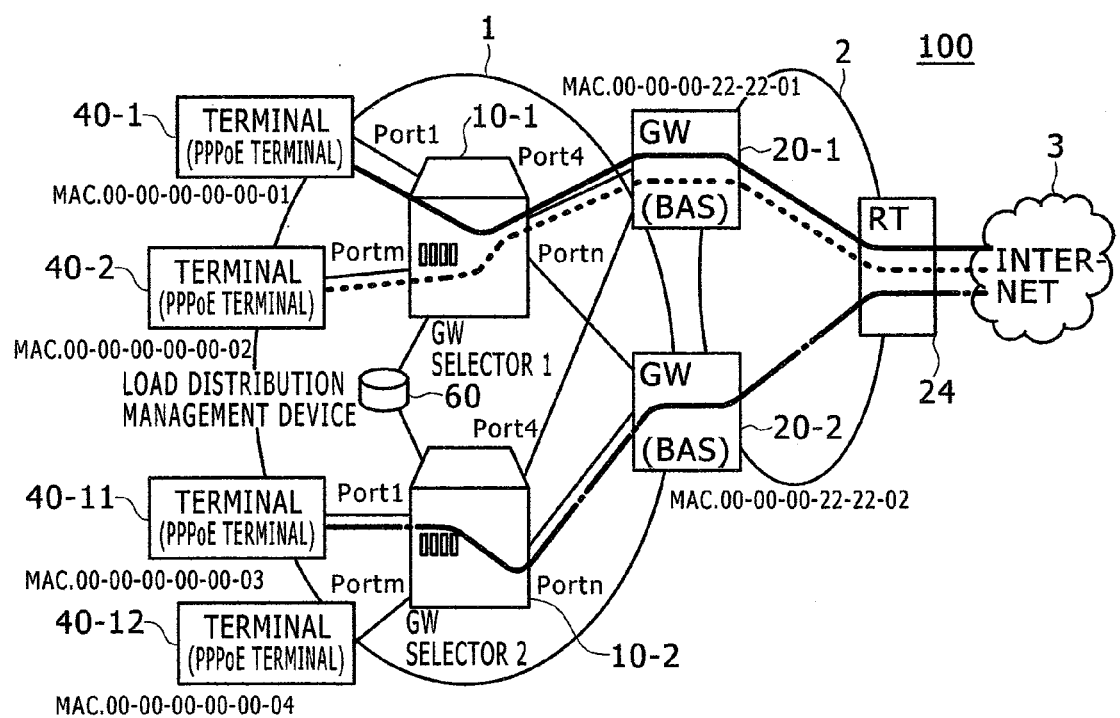
FIG. 2 is a simplified block diagram of the communication network.

Referring to FIG. 2, description will be made on a load distribution gateway selection function in the gateway devices and the load distribution management device. Here, FIG. 2 is a simplified block diagram of the communication network. In the following description, it is assumed that the gateway selectors 10-1, 10-2 are connected to two redundant gateway devices (20-1, 20-2), respectively, and a session connection request is received from the terminal 40 to perform a session connection procedure using PPPoE. Incidentally, "MAC xx-xx-xx-xx-xx-xx" associated with the terminal block and gateway block, indicates the value of the MAC address of each terminal or gateway device.

Upon reception of a connection request using PPPoE from the terminal 40-1, the gateway selector 10-1 performs a connection control procedure by assuming that the terminal 40-1 is a PPPoE terminal, and that the gateway devices connected to the gateway selector 10-1 are BASs 20-1 and 20-2.

Upon reception of responses from the gateway devices (BASs) to the connection request, the gateway selector 10-1 selects the gateway device 20-1, which is selected and notified by load distribution control in the load distribution management device 60, as an available BAS for the terminal 40-1. Then, the gateway selector 10-1 continues the following connection control procedure. Upon determination of the available BAS to be communicated with the PPPoE terminal 40-1, the other gateway device 20-2 is not involved in the packet transfer of the PPPoE terminal 40-1.

Similarly, the gateway selector 10-1 selects the gateway device 20-1 in response to a connection request from the PPPoE terminal 40-2. The gateway selector 10-2 selects the gateway device 20-2 in response to a connection request from the PPPoE terminal 40-11. Each of the PPPoE terminals 40 communicates with the Internet 3 through the gateway device 20 selected by the gateway selector 10-1 or 10-2 and by load distribution control in the load distribution management device 60. Upon reception of the connection request from the PPPoE terminal, the load distribution management device 60 executes a gateway selection (load distribution) algorithm as described below.

Figure 3:
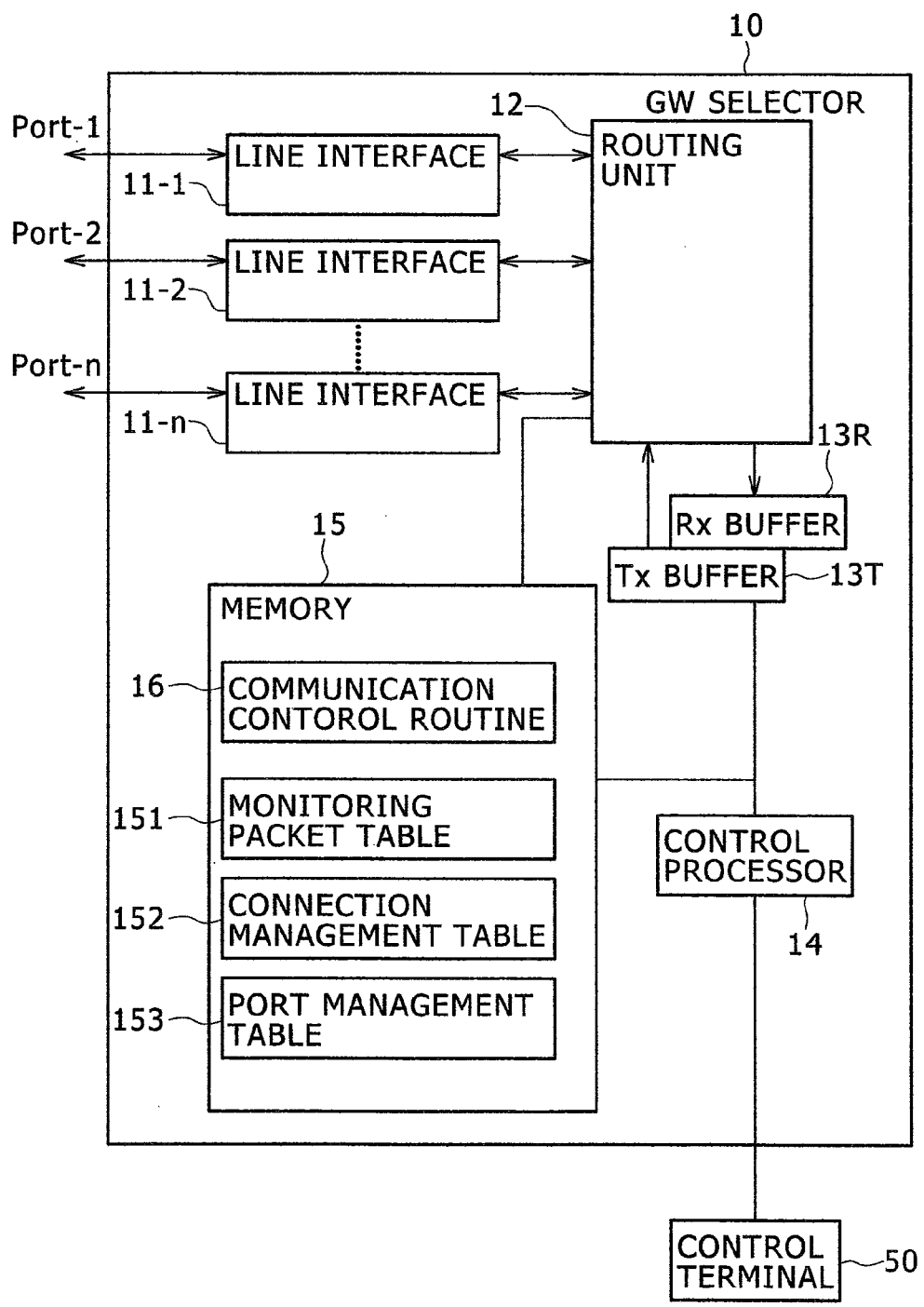
FIG. 3 is a hardware block diagram of a gateway selector.

The load distribution packet transfer device (gateway selector) will be described with reference to FIG. 3. Here, FIG. 3 is a hardware block diagram of the gateway selector. In FIG. 3, the gateway selector 10 includes: plural line interfaces 11 to which individual port numbers (Port-1 to Port-n) are assigned; a routing unit 12 connected to the line interfaces 11; a transmission buffer 13T and a reception buffer 13R for communication control packets; a control processor 14; and a memory 15.

The routing unit 12 and the control processor 14 constitute a protocol processing unit for controlling packet transfer among the line interfaces. The memory 15 stores a communication control routine 16 which is a program executed by the control processor 14, a monitoring packet table 151, a connection management table 152, and a port management table 153.

The communication control routine 16 includes various types of control packet reception processing routines and a timer monitor routine, which will be described with reference to FIGS. 10 to 12 and FIGS. 14 to 16. The monitoring packet table 151 specifies the types of communication control packets to be processed in the control processor 14. The operation mode of the control processor 14 can be changed by an operator operating a control terminal 50 to rewrite the content of the monitoring packet table 151. The connection management table 152 and the port management table 153 will be described below with reference to FIGS. 6A to 6F and FIG. 7.

When the gateway selector 10 is the gateway selector 10-1 of the access network 1 shown in FIG. 1, the line interfaces 11-1 to 11-n have a frame termination function corresponding to a communication protocol applied on the accommodation line, such as Ethernet, ATM, or PPP over SONET (POS). When the gateway selector 10 is the gateway selector 10-n for accommodating PON, the line interfaces 11-1 to 11-n have an OLT function for terminating a PON frame such as GE-PON, G-PON, or WDM-PON.

Figure 4:
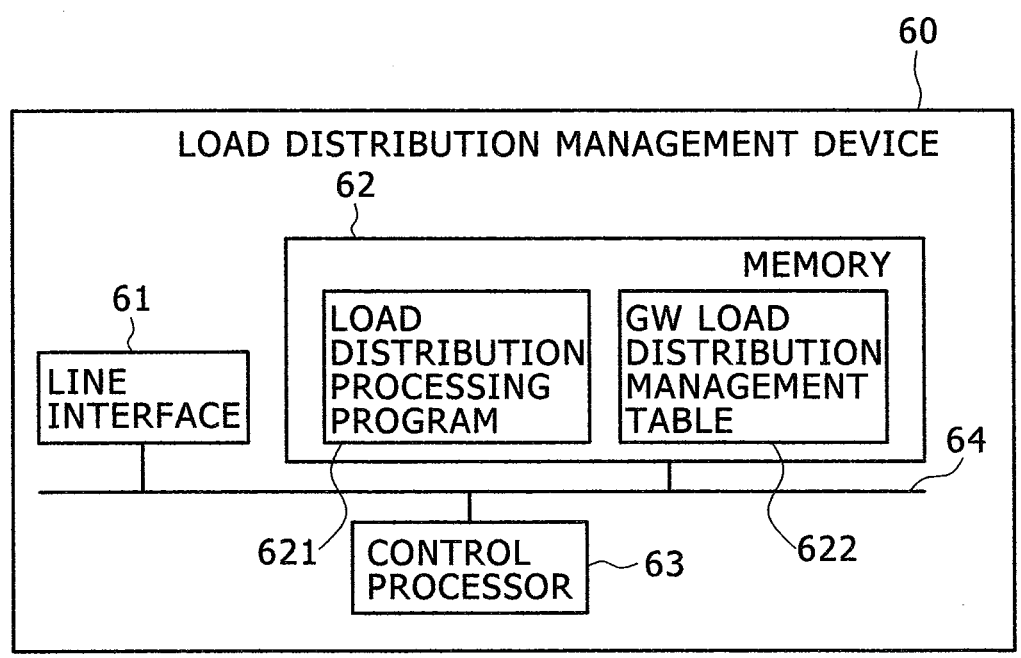
FIG. 4 is a hardware block diagram of a load distribution management device.

The load distribution management device will be described with reference to FIG. 4. Here, FIG. 4 is a hardware block diagram of the load distribution management device. In FIG. 4, the load distribution management device 60 includes a line interface 61 interconnected with a bus 64, a memory 62, and a control processor 63.

The memory 62 stores a load distribution processing program 621, and a gateway load distribution management table 622. The control processor 63 executes the load distribution processing program 621 to function as a load distribution processing unit of the load distribution management device 60.

The load distribution processing program 621 includes various types of control packet reception processing routines, a load distribution processing routine, and a timer monitor routine, as described below with reference to FIG. 13. The gateway load distribution management table 622 will be described in detail below with reference to FIG. 8.

Figure 5A:
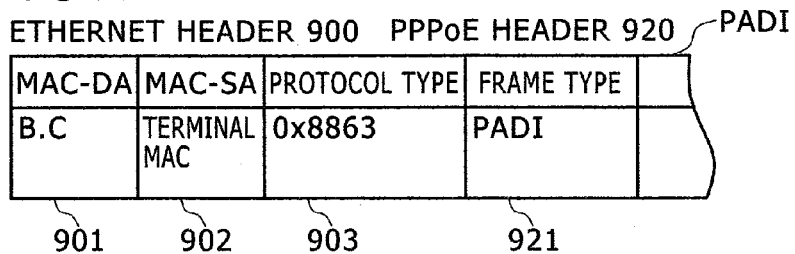
FIGS. 5A to 5D are formats of a communication control frame of PPPoE.
Figure 5B:
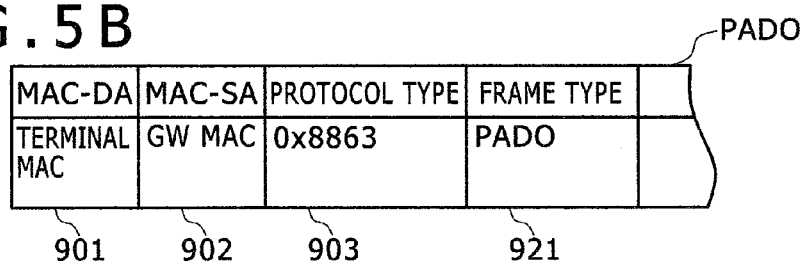
Figure 5C:
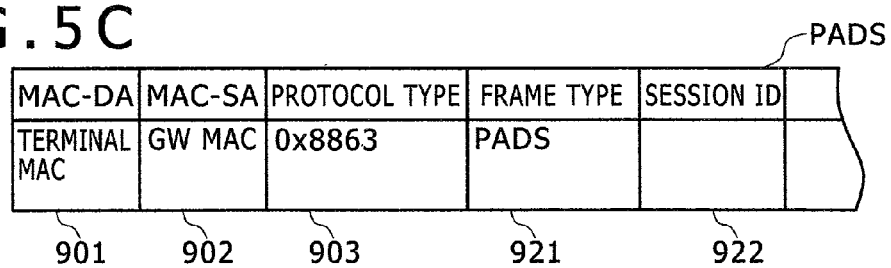
Figure 5D:
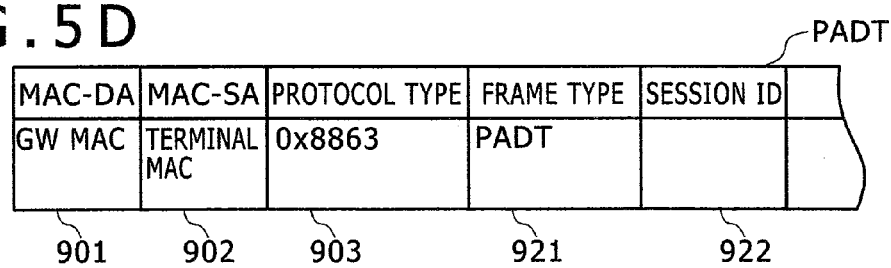

The formats of communication control frames used for PPPoE will be described with reference to FIGS. 5A to 5D. Here, FIGS. 5A to 5D show the formats of communication control frames of PPPoE. More specifically, FIG. 5A shows the format of a connection start packet, PADI, which is transmitted from the terminal 40 to the gateway device 20. FIG. 5B shows the format of a connection start response packet, PADO, which is transmitted from the gateway device 20 to the terminal 40. FIG. 5C shows the format of a session ID notification packet, PPPoE active discovery session-confirmation (PADS), which is transmitted from the gateway device 20 to the terminal 40. FIG. 5D shows the format of a disconnection notification packet, PPPoE active discovery terminate (PADT), which is issued by the terminal 40 or the gateway device 20. Each of the communication control frames is added with an Ethernet header 900 and a PPPoE header 920.

As shown in FIG. 5A, the PADI includes a broadcast MAC address (B.C) in MAC-DA 901, and a MAC address of the source terminal 40 in MAC-SA 902. A specific value such as "0x8863" indicating PPPoE, is set in a protocol type 903. A code indicating that the frame is "PADI" is set in a frame type 921.

As shown in FIG. 5B, the PADO includes the MAC address of the PADI source terminal 40 in MAC DA 901, and a MAC address of the gateway device 20 in MAC-SA 902. The specific value "0x8863" indicating PPPoE, is set in the protocol type 903. A code indicating that the frame is "PADO" is set in the frame type 921 of the PPPoE header 920.

As shown in FIG. 5C, the PADS includes the MAC address of the PADI source terminal 40 in MAC-DA 901, and the MAC address of the gateway device 20 in MAC-SA 902. The specific value "0x8863" indicating PPPoE, is set in the protocol type 903. A code indicating that the frame is "PADS" is set in the frame type 921 of the PPPoE header. A value of the session ID assigned to the terminal 40 from the gateway device 20 is set in a session ID 922.

When a PADT packet is transmitted from the terminal 40 to the gateway device 20, the PADT includes, as shown in FIG. 5D, the MAC address of the gateway device 20 in MAC-DA 901, and the MAC address of the terminal 40 in MAC SA 902. The specific value "0x8863" indicating PPPoE, is set in the protocol type 903. A code indicating that the frame is "PADT" is set in the frame type 921 of the PPPoE header. A session ID to be disconnected is set in the session ID 922. Incidentally, when the gateway device 20 transmits a PADT packet to the terminal 40, the relationship between the MAC-DA 901 and the MAC-SA 902 is reversed.

The different types of management tables will be described with reference to FIGS. 6A to 6F, FIG. 7, and FIGS. 8A and 8B. Here, FIGS. 6A to 6F are views for illustrating the connection management table. FIG. 7 is a view for illustrating the port management table. FIGS. 8A and 8B are views for illustrating the load distribution management table.

FIGS. 6A to 6F show the states of the connection management table 152 at specific timings. Here, the general connection management table 152 is described, and its transition will be described in detail below. The terminal management table 152 includes a terminal port 1521, terminal MAC 1522, gateway port 1523, gateway MAC/*gateway MAC-SA 1524, status 1525, and timer value 1526.

In FIG. 7, the port management table 153 includes a port No. 1531, gateway connection flag 1532, and MAC address 1533. The port No. 1531 is a port number of the gateway selector 10. A port with the gateway connection flag 1532 of "1" is connected to the gateway device 20, and the destination MAC address is written to the MAC address 1533. While a port with the gateway connection flag 1532 of "0" is connected to the terminal 40, the load distribution management device 60 or the like, and the destination MAC address is written to the MAC address 1533. Incidentally, one port has plural records in the MAC address 1533 so that switches are cascaded to the port.

In FIGS. 8A and 8B, the gateway load distribution management table 622 includes a gateway MAC 6221, management priority 6222, selection priority 6223, connection rate 6224, maximum number of connections 6225, and number of connections 6226. The connection rate 6224 is a value determined by dividing the number of connections 6226 by the maximum number of connections 6225. The priority "1" is given to the gateway 20 whose connection rate 6224 is the lowest with the lowest MAC address.

Figure 9:
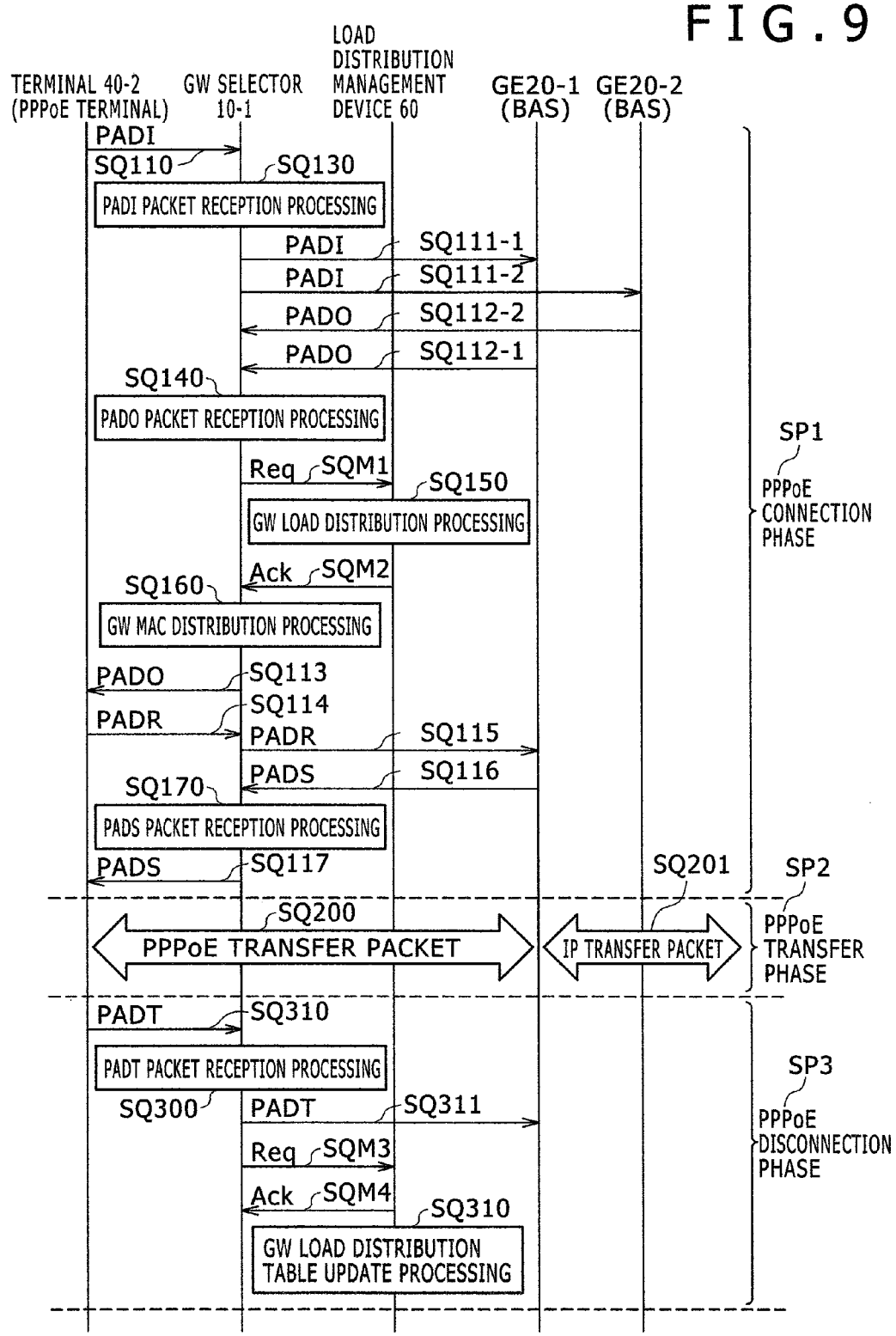
FIG. 9 is a sequence diagram showing PPPoE connection control by a load distribution packet transfer system.
Figure 10:
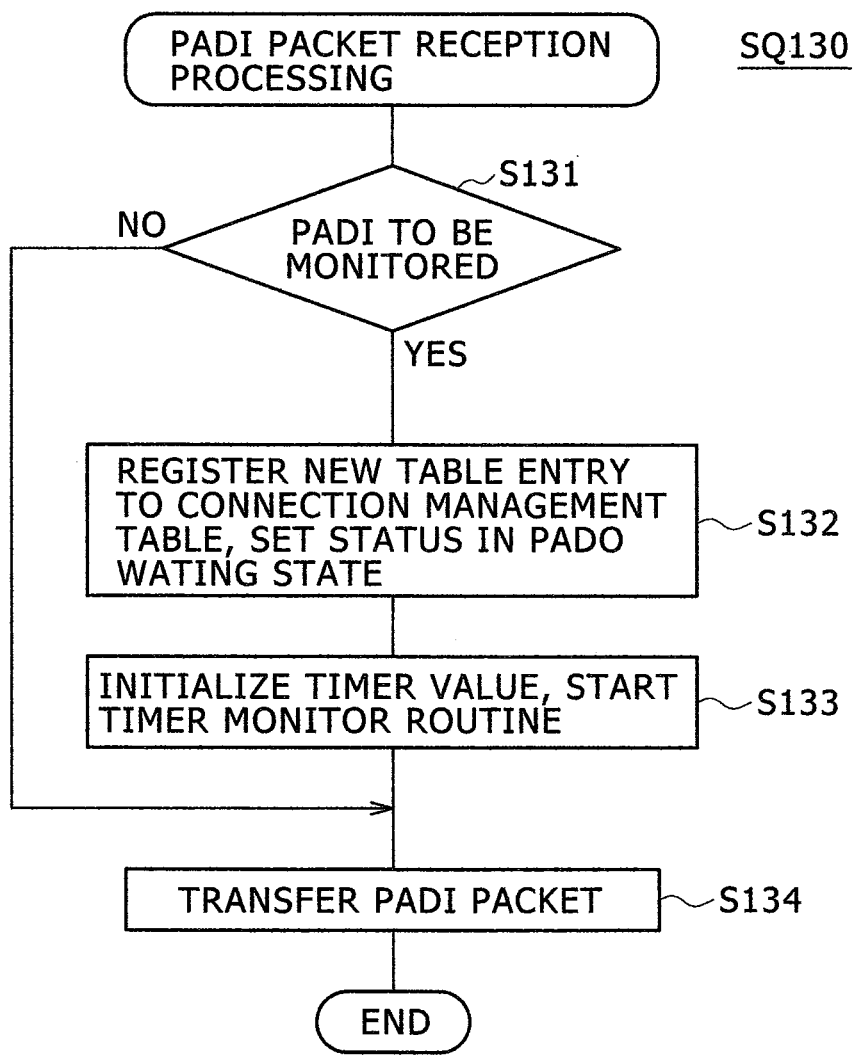
FIG. 10 is a flowchart of PADI packet reception processing performed by the gateway selector.
Figure 11:
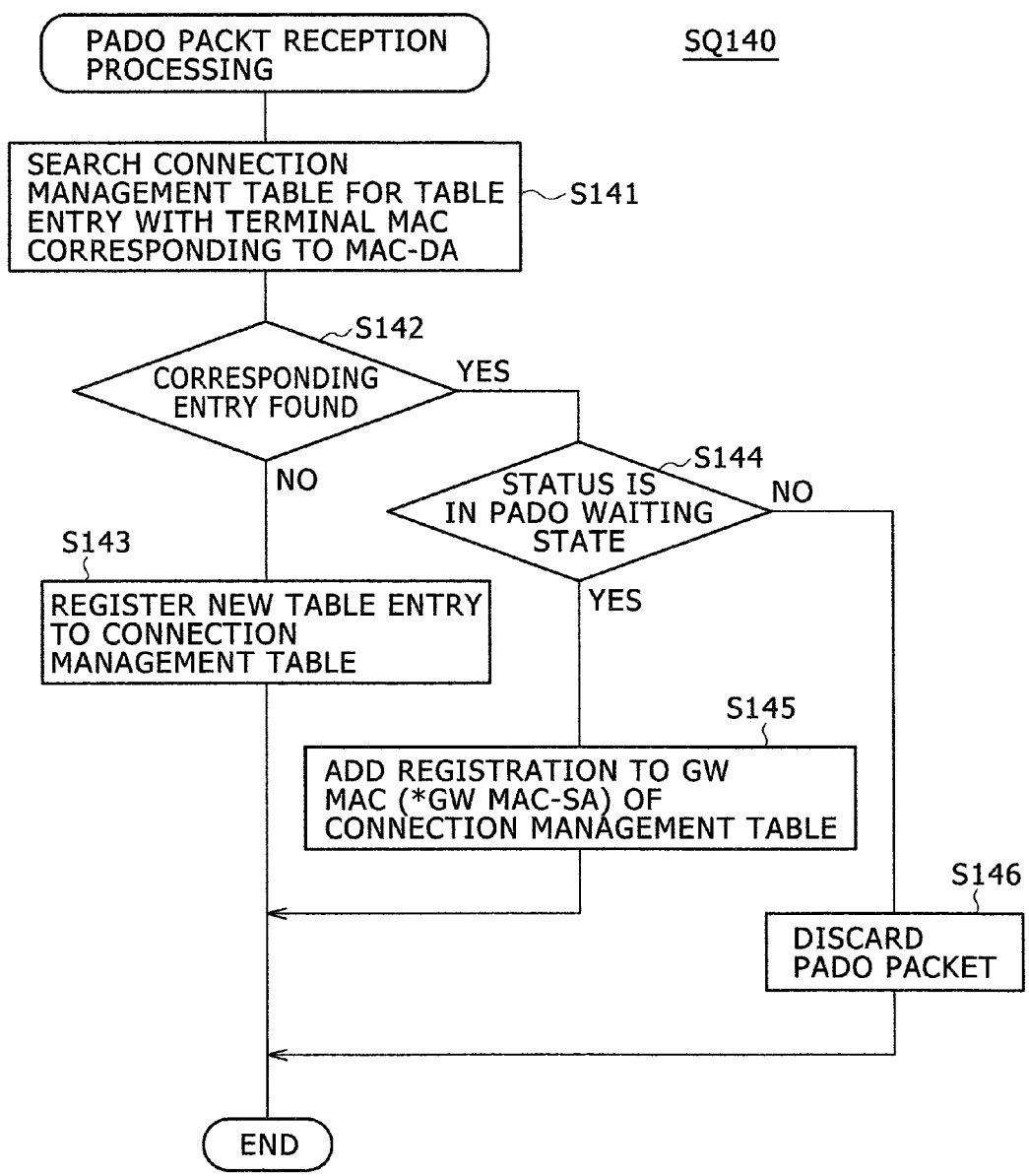
FIG. 11 is a flowchart of PADO packet reception processing performed by the gateway selector.
Figure 12:
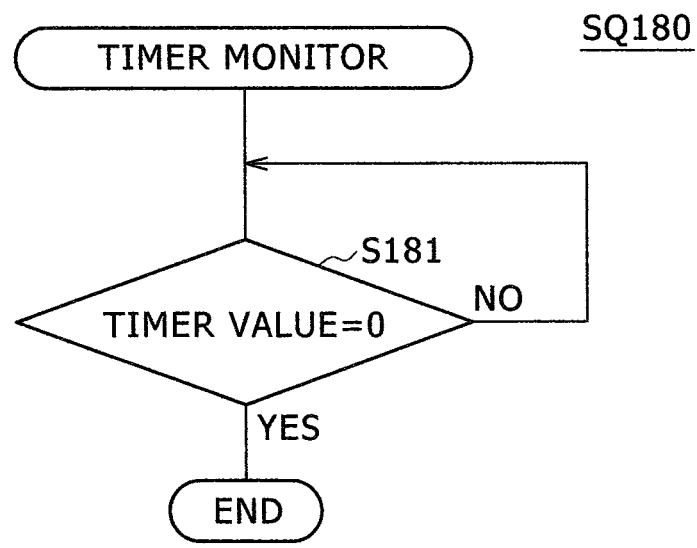
FIG. 12 is a flowchart of timer monitor processing performed by the gateway selector.
Figure 14:
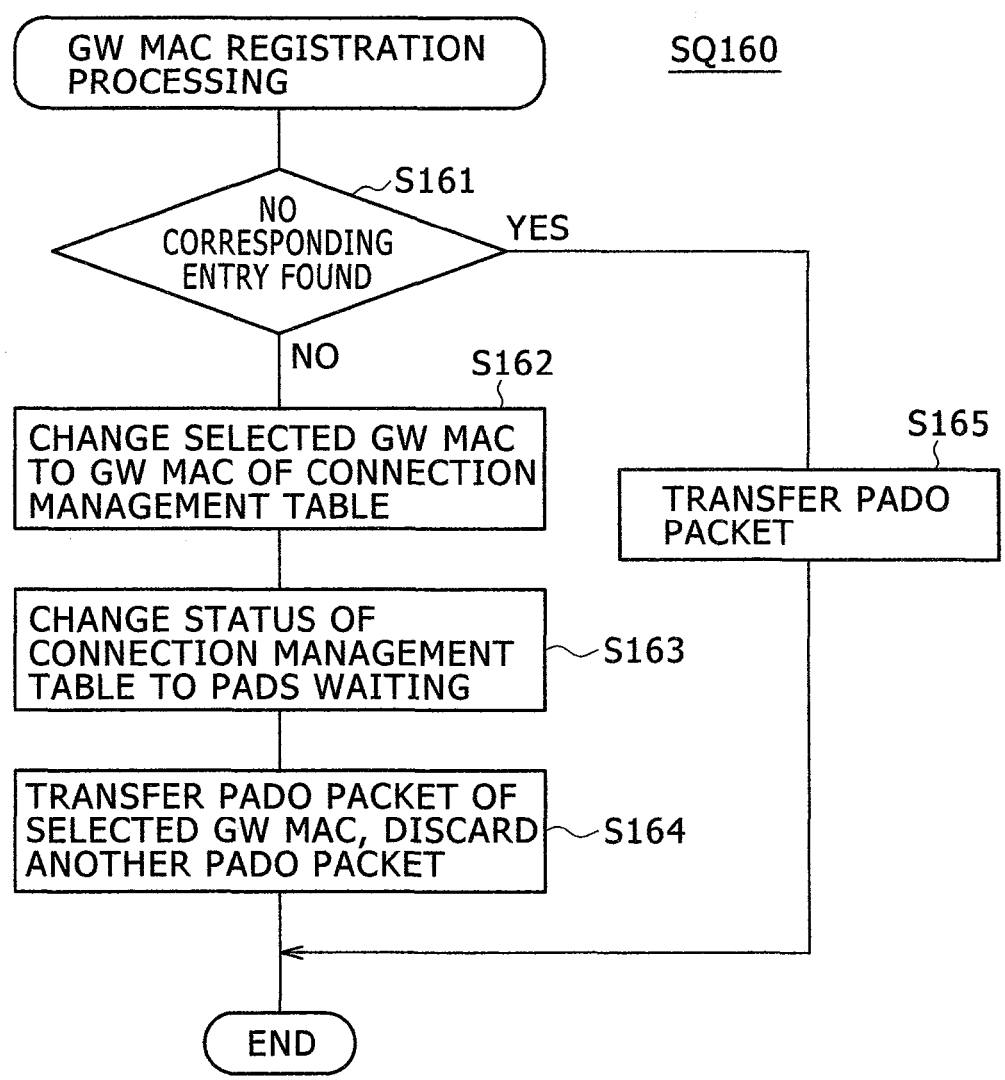
FIG. 14 is a flowchart of gateway MAC registration processing performed by the gateway selector.
Figure 15:
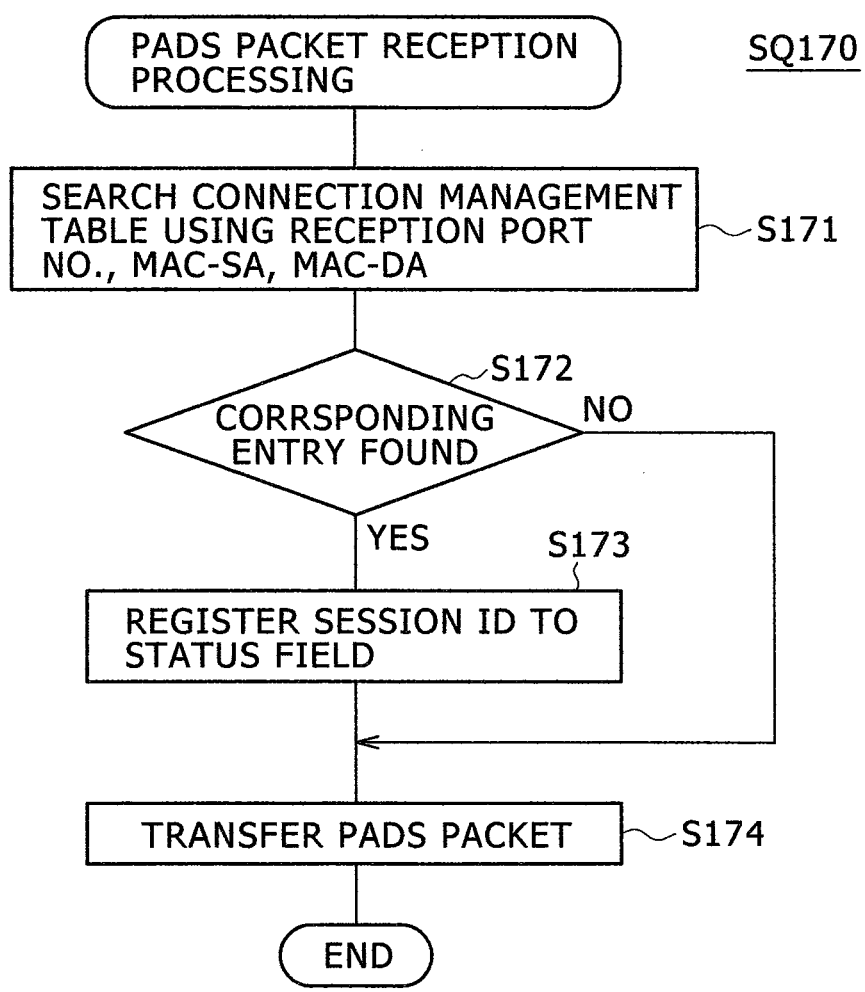
FIG. 15 is a flowchart of PADS packet reception processing performed by the gateway selector.
Figure 16:
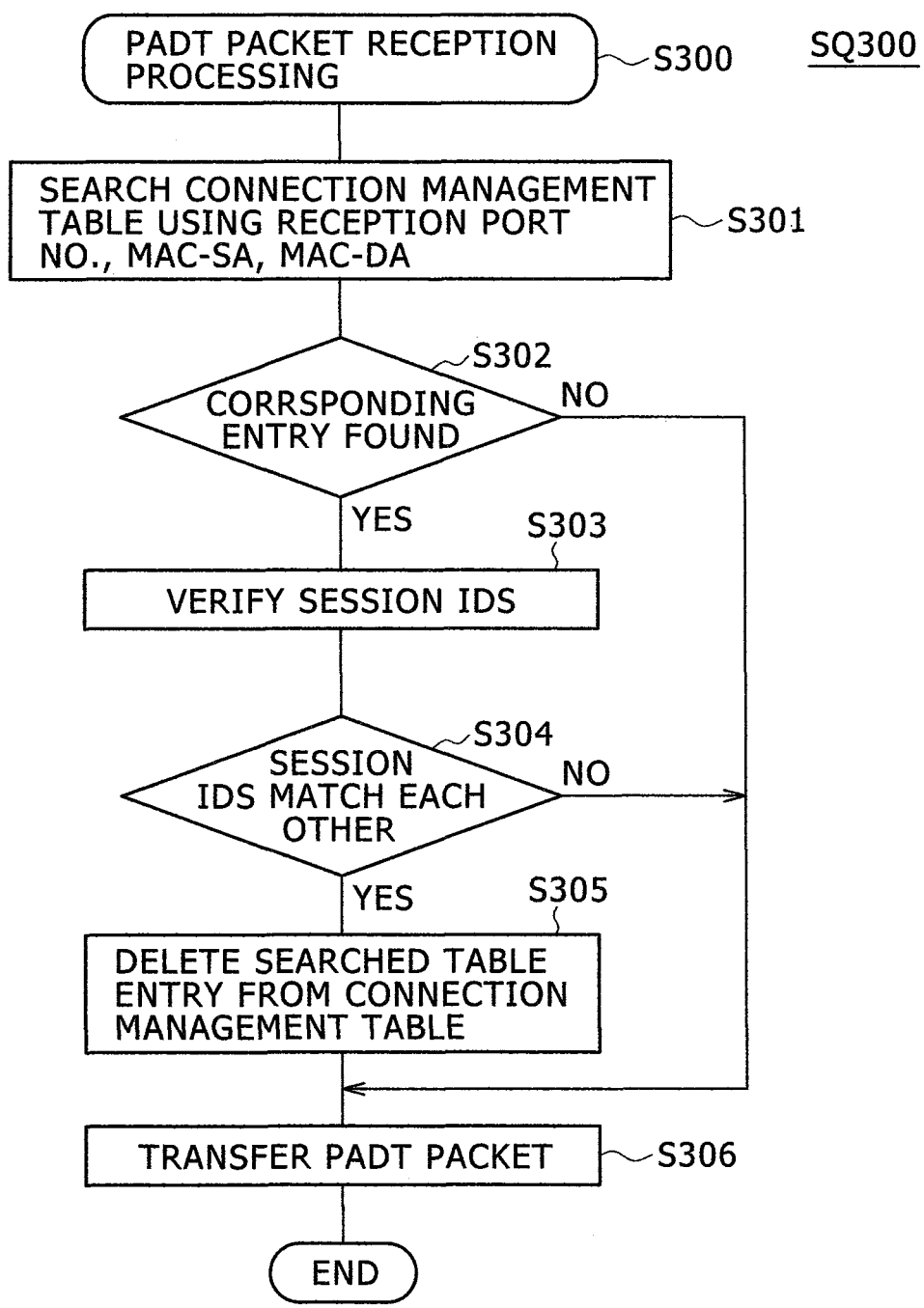
FIG. 16 is a flowchart of PADT packet reception processing performed by the gateway selector.

Next, PPPoE connection control by the load distribution packet transfer system will be described with reference to FIGS. 9 to 16. Here, FIG. 9 is a sequence diagram showing PPPoE connection control by the load distribution packet transfer system. FIG. 10 is a flowchart of PADI packet reception processing performed by the gateway selector. FIG. 11 is a flowchart of PADO packet reception processing performed by the gateway selector. FIG. 12 is a flowchart of timer monitor processing performed by the gateway selector. FIG. 13 is a flowchart of gateway load distribution processing performed by the load distribution management device. FIG. 14 is a flowchart of gateway MAC registration processing performed by the gateway selector. FIG. 15 is a flowchart of PADS packet reception processing performed by the gateway selector. FIG. 16 is a flowchart of PADT packet reception processing performed by the gateway selector.

Here, an example of the gateway selection method will be described. The gateway selector 10-1 shown in FIG. 2 receives response packets (PADO) from the gateway devices 20-1 and 20-2. Of the received response packets, the gateway selector 10-1 enables the response packet from the gateway device with the highest priority that is selected by the load distribution control in the load distribution management device 60. Then, the gateway selector 10-1 performs the following communication control and packet transfer. The load distribution management device 60 sets the priority of the selected gateway lower than the current value. Thus, another high priority gateway device is enabled in the next connection query from a certain gateway selector 10.

In FIG. 9, the terminal (PPPoE terminal) 40-2 broadcasts a PADI packet (SQ110). Then, a PPPoE connection phase SP1 is started.

The routing unit 12 of the gateway selector 10-1 receives the broadcast PADI packet, and outputs the PADI packet to the reception buffer 13R, together with a reception port number "m". The control processor 14 performs the PADI packet reception processing (SQ130). Then, the control processor 14 records the values of the terminal MAC 1522, status 1525, and timer value 1526 in ENm of the connection management table 152 shown in FIG. 6A. The routing unit 12 broadcasts the PADI packet to the plural line interfaces of the table entries each corresponding to the gateway connection flag 1532 of "1" in the port management table 153 of FIG. 7, namely, the line interfaces connected to the gateway devices (SQ111-1, SQ111-2). Incidentally, the transmission of the broadcast packet to a port 5 is omitted here to simplify the illustration.

The gateways devices (BASs) 20-1 and 20-2 transmit PADO packets, respectively, in response to the PADI packet (SQ112-1, SQ112-2). The destination MAC address (MAC-DA 901) of the PADO packets is "00-00-00-00-00-02" which is the MAC address of the PPPoE terminal 40-2.

The routing unit 12 of the gateway selector 10-1 outputs the first PADO packet received from the gateway device (BAS) 20-2, to the reception buffer 13R, together with a reception port number "n". The second PADO packet received from the gateway device (BAS) 20-1 is output to the reception buffer 13R, together with a reception port number "4".

The control processor 14 performs the PADO packet reception processing routine shown in FIG. 11 (SQ140). Then, the control processor 14 transmits a selection request including plural *gateway MAC-SA lists, to the load distribution management device 60 (SQM1). Incidentally, the asterisk "*" at the beginning of each address means not determined.

Figure 13:
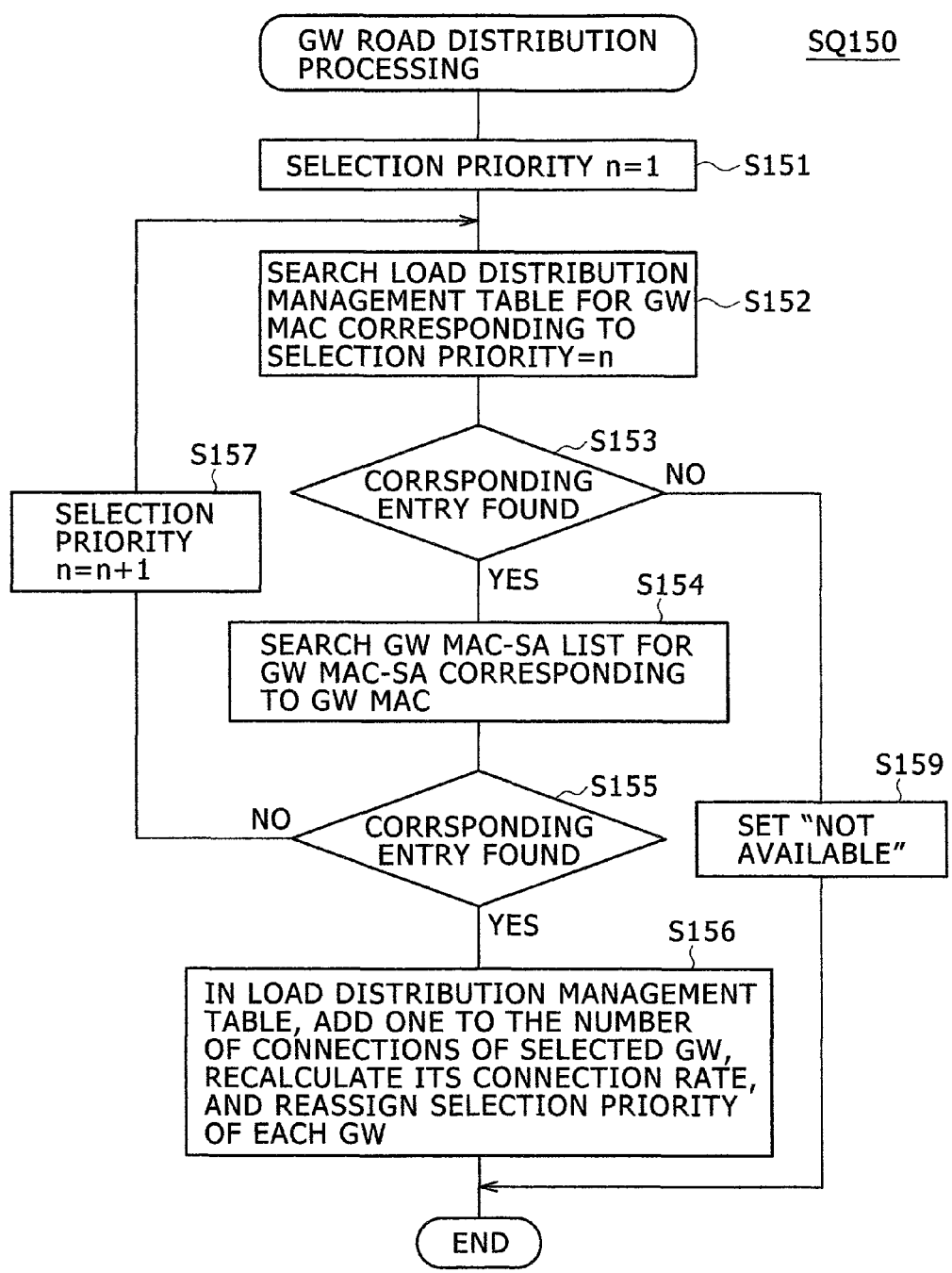
FIG. 13 is a flowchart of gateway load distribution processing performed by the load distribution management device.

The load distribution management device 60 receives the selection request from the gateway selector 10-1, and performs the gateway load distribution processing shown in FIG. 13 (SQ150). Incidentally, the gateway load distribution processing 150 constitutes part of the load distribution processing program 621 of FIG. 4. The load distribution management device 60 transmits a selection response with the MAC address of the selected gateway device (BAS) attached, to the gateway selector 10-1 (SQM2).

When the gateway selector 10-1 receives the selected MAC address from the load distribution management device 60, the control processor 14 performs the gateway MAC registration processing of FIG. 14 (SQ160). Upon completion of the gateway MAC registration processing, the routing unit 12 refers to the port management table 153 based on the destination MAC address (MAC-DA 901) of the received packet. Here, the destination MAC address of the PADO packet is "00-00-00-00-00-02". As shown in the port management table 153 of FIG. 7, the port number 1531 corresponding to the MAC address "00-00-00-00-00-02" is "m" which is the connection port number of the PPPoE terminal 40-2. Thus, the routing unit 12 transmits the PADO packet from the line interface of the port number "m" (SQ113).

Upon reception of the PADO packet, the PPPoE terminal 40-2 transmits a PADR packet to the gateway device (BAS) 20-1 which is the source of the PADO packet (SQ114). Here, as shown in the connection management table 152 of FIG. 6D, the status 1525 of the table entry ENm corresponding to the terminal 40-2 is in a waiting state for PADS which is a response packet to the PADR. Because the PADR packet is excluded from the monitoring target in the gateway selector 10-1, the control processor 14 of the gateway selector 10-1 transmits the PADR packet to the routing unit 12 immediately after receiving the PADR packet from the routing unit 12. Upon reception of the PADR packet, the routing unit 12 routes the received packet according to the port management table 153.

The destination MAC address (MAC-DA 901) of the PADR packet is "00-00-00-22-22-01" which is the MAC address of the gateway device (BAS) 20-1. The port management table 153 stores the port number "4" of the connection line corresponding to the MAC address of the gateway device (BAS) 20-1. Thus, the PADR packet is transferred to the gateway device (BAS) 20-1 through a line interface 11-4 (SQ115).

The gateway device (BAS) 20-1 transmits a PADS packet in response to the PADR (SQ116). Upon reception of the PADS packet, the routing unit 12 of the gateway selector 10-1 outputs the received PADS packet to the reception buffer 13R, together with the reception port number "4".

Upon reception of the PADS packet, the control processor 14 performs the PADS packet reception processing routine shown in FIG. 15 (SQ170).

Because the destination address (MAC-DA 901) of the PADS packet is "00-00-00-00-00-02", the routing unit 12 transfers the PADS packet to the line interface of the port number "m" as shown in the port management table 153 of FIG. 7. In this way, the PADS packet is transmitted to the PPPoE terminal 40-2 (SQ117).

At the time when the PPPoE terminal 40-2 receives the PADS packet, the packet transfer system moves from the PPPoE connection phase SP1 to PPPoE transfer phase SP2. In the PPPoE transfer phase SP2, the gateway selector 10-1 transfers a user packet that is communicated between the PPPoE terminal 40-2 and the gateway device (BAS) 20-1 (SQ200).

In the PPPoE transfer phase SP2, the gateway device (BAS) 20-1 receives a PPPoE packet from the PPPoE terminal 40-2 through the gateway selector 10-1 (SQ200). The gateway device (BAS) 20-1 converts the received packet to an IP packet, and transfers the packet to the router 24 (SQ201). When the gateway device (BAS) 20-1 receives the IP packet from the router 24 (SQ201), the gateway device (BAS) 20-1 converts it to a PPPoE packet and transfers the PPPoE packet to the PPPoE terminal 40-2 through the gateway selector 10-1 (SQ200).

When a terminal user completes the Internet access, a connection completion packet PADT is transmitted from the PPPoE terminal 40-2 to the gateway device (BAS) 20-1 (SQ310). Then, the packet transfer system moves from the PPPoE transfer phase SP2 to PPPoE disconnection phase SP3.

The routing unit 12 of the gateway selector 10-1 receives the PADT packet, and performs the PADT packet reception processing routine shown in FIG. 16 (SQ300). Upon completion of the reception processing routine, the routing unit 12 identifies the port number 1531 of the output port from the port management table 153. Then, the routing unit 12 transfers the PADT packet to the gateway device (BAS) 20-1 (SQ311).

The control processor 14 notifies the load distribution management device 60 of the value "00-00-00-22-22-01" which is the destination MAC address (MAC-DA 901) of the received PADT packet (SQM3).

The load distribution management device 60 receives the identified MAC address "00-00-00-22-22-01" from the gateway selector 10-1, and transmits a reception response to the gateway selector 10-1 (SQM4).

The load distribution management device 60 also performs update processing of the gateway load distribution table (SQ310). More specifically, the control processor 63 searches the load distribution management table 622 for the table entry whose gateway MAC 6221 corresponds to the identified MAC address. The control processor 63 recalculates the connection rate 6224 by subtracting 1 from the value of the number of connections 6226 of the corresponding table entry. Then, the control processor 63 reassigns the selection priority 6223 from the smallest value of the number of connections 6226 or of the connection rate 6224. In this way, the information of the load distribution management table 622 is updated.

The PADI packet reception processing will be described with reference to FIG. 10. The PADI packet reception processing routine constitutes part of the communication control routine 16, together with the PADO packet reception processing routine, the gateway MAC registration processing routine, PADS packet reception processing routine, timer monitor routine, and PADT packet reception processing routine which will be described later.

In the PADI packet reception processing routine shown in FIG. 10, the control processor 14 refers to the monitoring packet table 151 and determines whether the PADI is specified as the target packet to be monitored (S131). If the PADI packet is not specified as the monitoring target, the control processor 14 transfers the received PADI packet to the routing unit 12 through the transmission buffer 13T (S134), and ends the routine.

When the PADI packet is specified as the monitoring target in step 131, the control processor 14 registers a new table entry ENm in the connection management table 152 (S132). This table entry ENm, as shown in FIG. 6A, includes the reception port "m" notified from the routing unit 12 as the terminal port 1521, and the source MAC address of the received packet "00-00-00-00-00-02" as the terminal MAC 1522. The status 1525 is in the PADO waiting state. Next, the control processor 14 initializes the timer value 1526 of the table entry ENm to a predetermined value (the timer value=3,000 ms), and starts a timer monitor routine SQ180 (S133) as described later with reference to FIG. 12. Then, the control processor 14 transfers the received PADI packet to the transmission buffer 13T (S134), and ends the routine.

In FIG. 11, the control processor 14 first searches the connection management table 152 for the table entry whose terminal MAC 1522 corresponds to the value "00-00-00-00-00-02" which is the destination MAC address (MAC-DA 901) of the PADO packet (S141).

As a result of the search (S142), when the table entry ENm corresponding to the destination MAC address is found (Yes), the control processor 14 determines whether the status 1525 of the table entry ENm is in the PADO waiting state (S144). When the status 1525 is not in the PADO waiting state (No), the control processor 14 determines that the received PADO packet is an invalid packet, and discards the received packet (S146). Then the routine ends.

In this case, as shown in FIG. 6A, the status 1525 is in the PADO waiting state in the table entry ENm searched from the connection management table 152. Thus, the answer is Yes in step 144. The control processor 14 records the value "00-00-00-22-22-02" which is the source MAC address (MAC-SA 902) of the received PADO packet, to the gateway MAC (*gateway MAC-SA) 1524 as shown in FIG. 6B. Then, the control processor 14 registers the reception port number "n" to the gateway port 1523, and ends the routine.

Similarly, the control processor 14 reads the PADO packet transmitted from the gateway device (BAS) 20-1 and the reception port number, from the reception buffer 13R. Then, the control processor 14 performs the PADO packet reception processing routine SQ140 shown in FIG. 11. The control processor 14 additionally records the value "00-00-00-22-22-01" which is the source MAC address (MAC-SA 902) of the second received PADO packet, to the gateway MAC (*gateway MAC-SA) 1524, as well as the reception port number "4" to the gateway port 1523 (S145) as shown in FIG. 6C. Then the routine ends.

Incidentally, when the PADI is not specified as the target packet to be monitored, the registration to the connection management table 152 is not performed in the PADI packet reception processing routine SQ130 described in FIG. 10. In such a case, the table entry corresponding to the destination MAC address is not found (No) as a result of the search (S142). Thus, the control processor 14 generates a new table entry ENm based on the PADO packet, and registers the generated table entry ENm to the connection management table 152 (S143). Then the routine ends.

The timer monitor routine SQ180 will be described with reference to the flowchart of FIG. 12. In FIG. 12, the timer monitor routine SQ180 is started upon reception of the PADI packet. The timer monitor routine SQ180 is periodically performed by the control processor 14, in parallel to the PADO packet reception processing routine SQ140 described above.

In the timer monitor routine SQ180, the control processor 14 waits until the timer value 1526 is "0" (timeout) in the table entry ENm of the connection management table 152 (S181). When the timer value 1526 is timeout (the timer value=0 ms), the control processor 14 ends the routine.

In the gateway load distribution processing SQ150 shown in FIG. 13, the control processor 63 first initializes the selection priority n to 1 (S151). Then, the control processor 63 searches the load distribution management table 622 of FIG. 8A for the table entry whose selection priority 6223 corresponds to the selection priority n=1 (S152).

As a result of the search (S153), when the table entry corresponding to the selection priority n=1 is found, the control processor 63 searches the *gateway MAC-SA list for the *gateway MAC-SA corresponding to the MAC address "00-00-00-22-22-01" of the gateway MAC 6221 of the relevant table entry (S154).

As a result of the search (S155), when the *gateway MAC-SA corresponding to the MAC address "00-00-00-22-22-01" of the gateway MAC 6221 of the relevant table entry is found, the control processor 63 determines the corresponding MAC address as the selected MAC address "00-00-00-22-22-01". The control processor 63 adds 1 to the value of the number of connections 6226 of the corresponding table entry, and recalculates the connection rate 6224. Then, the control processor 63 reassigns the selection priority 6223 from the smallest value of the connection rate 6224 (or the number of connections 6226) (S156).

In this case, by performing step 156, the table entry of the selected gateway MAC 6221="00-00-00-22-22-01" is changed as shown in FIG. 8B. That is, the value of the number of connections 6226 is changed from "999" to "1000", and the value of the connection rate 6224 from "19.98" to "20.00". As a result, the selection priority 6223 of the gateway MAC 6221="00-00-00-22-22-01" is changed from "1" to "2", and the selection priority 6223 of the gateway MAC 6221="00-00-00-22-22-02" from "2" to "1". Upon completion of the reassignment of the selection priority 6223, the control processor 63 ends the routine.

Incidentally, as a result of the search performed in step 154 (S155), when the * gateway MAC-SA corresponding to the MAC address of the gateway MAC 6221 of the table entry is not found, the control processor 63 adds 1 to the value of the selection priority n (S157), and performs step 152 again.

Further, as a result of the search performed in step 152 (S153), when the table entry corresponding to the selection priority n is not found (No), the control processor 63 sets "MAC address not available" (S159), and ends the routine. Such an event could occur when the table entry is automatically deleted by the timer monitor routine.

Incidentally, the selected MAC address or "MAC address not available" is transmitted to the gateway selector 10-1 in SQM2 of FIG. 9.

In the gateway MAC registration processing routine SQ160 shown in FIG. 14, the control processor 14 first confirms the selected MAC address. As a result of the confirmation (S161), the control processor 14 changes the selected MAC address "00-00-00-22-22-01" to the gateway MAC (*gateway MAC-SA) 1524 of the table entry ENm of the connection management table 152 (S162). Further, the control processor 14 changes the value of the status 1525 to PADS waiting (S163). The control processor 14 transfers the stored PADO packet received from the selected gateway device, to the transmission buffer 13T, and discards another PADO packet (S164). Then the routine ends.

Incidentally, as a result of the confirmation (S161), when no MAC address is available, the control processor 14 discards the stored PADO packets (S165), and ends the routine.

In the PADS packet reception processing routine SQ170 shown in FIG. 15, using a search key including the reception port number "4" notified from the routing unit 12, the value "00-00-00-00-00-02" of the destination MAC address (MAC-DA 901) of the received packet, and the value "00-00-00-22-22-01" of the source MAC address (MAC-SA 902), the control processor 14 searches the connection management table 152 for the table entry whose values of the gateway port 1523, terminal MAC 1522, and gateway MAC 1524 match the search key (S171).

As a result of the search (S172), when the table entry ENm corresponding to the search key is found (Yes), as shown in FIG. 6E, the control processor 14 sets the value of the session ID (here, "1,000") indicated by the received PADS packet, in the status 1525 of the relevant table entry (S173). The control processor 14 transfers the PADS packet to the routing unit 12 through the transmission buffer 13T (S174), and ends the routine. When the answer is No in step 172, the control processor 14 directly moves to step 174.

In the PADT packet reception processing routine SQ300 shown in FIG. 16, using a search key including the reception port number "m", the value "00-00-00-00-00-02" of the source MAC address (MAC-SA 902) of the received packet, and the value "00-00-00-22-22-01" of the destination MAC address (MAC-DA 901), the control processor 14 searches the connection management table 152 for the table entry whose values of the terminal port 1521, terminal MAC 1522, and gateway MAC 1524 match the search key (S301). Here, the reception port number may be excluded from the search key items.

As a result of the search (S302), when the table entry ENm corresponding to the search key is found (Yes), the control processor 14 determines whether the session ID value indicated in the status 1525 of the relevant table entry is equal to the session ID value "1,000" indicated in the session ID 922 of the received PADT packet (S303).

As a result of the determination (S304), when the two session IDs are equal to each other (Yes), the control processor 14 deletes the table entry ENm from the connection management table 152 as shown in FIG. 6F (S305). The control processor 14 transfers the received packet to the routing unit 12 through the transmission buffer 13T (S306), and ends the routine.

Incidentally, when the table entry ENm corresponding to the search key is not found (No) as a result of the search (S302), and when the session IDs are not equal to each other (No) as a result of the determination (S304), the control processor 14 transfers the received PADT packet to the routing unit 12 (S306), and ends the routine. Such an event could occur when the table entry is automatically deleted in the timer monitor routine.

In the above described embodiment, the control processor 14 in the gateway selector 10 determines whether the received packet is the communication control packet to be monitored, by referring to the monitoring packet table 151. However, it is also possible that the routing unit 12 performs the determination and selectively transfers only the communication control packet to be monitored, to the control processor 14.

As understood from the above described embodiment, the load distribution packet transfer device (gateway selector) 10 broadcasts a connection start request packet received from the PPPoE terminal 40, to the plural gateway devices (BASs) 20. Of plural response packets received within a predetermined period of time, the load distribution packet transfer device (gateway selector) 10 enables only the response packet from the specific gateway device 20 selected by the load distribution control in the load distribution management device 60. Then, the enabled packet is transferred to the requesting terminal. The PPPoE terminal 40 performs the following communication control procedure with the source gateway device of the response packet. Accordingly, with the load distribution packet transfer system of the embodiment, it is possible to provide redundancy and load distribution of the gateway devices (BASs) 20, independent of the implementation of the PPPoE terminal 40. Further, there is no need to add a special function as described in JP-A No. 2005-064936.

In this embodiment, description has been made on the connection control procedure between the PPPoE terminal 40 and the redundant gateway device (BAS). However, the load distribution packet transfer system of the embodiment can also be applied to the connection control procedure between a supplicant (user terminal) and an authenticator (gateway device) in IEEE802.1X.

The load distribution packet transfer device of the embodiment can function as a L2SW, PON system, wireless access point, or wireless bridge, by means of a line interface such as a metal line interface, optical line interface, or wireless line interface, or by mean of a line interface having an optical line terminal (OLT) function of passive optical network (PON).

The load distribution packet transfer system of the embodiment is used in a network configuration in which plural load distribution packet transfer devices are connected to each of plural gateway devices. The load distribution packet transfer system includes a load distribution management device to provide management of the user connection information and the like of each gateway device, as well as centralized management of load distribution control. This allows the ISP or carrier to manage the redundant configuration, which is constructed by considering the load distribution rate of the gateway devices for connecting the access network to the Internet relay network, without installing special software in the user terminal. Further, the load distribution packet transfer system of the embodiment can also have a protocol identification function in a protocol processing unit. This allows coexistence of plural types of user terminals using different communication protocols, for example, PPPoE terminals and EAPOL terminals (supplicants) in IEEE802.1X, in the same layer 2 access network.

According to the present invention, in a network configuration including plural redundant gateway devices for connecting an access network to which a user terminal is connected, and a relay network to the Internet, it is possible to provide a packet transfer system for connecting the user terminal while considering the load distribution of the gateway devices.

What is claimed is:

1. A packet transfer system comprising:
a plurality of load distribution packet transfer devices provided among a plurality of user terminals and a plurality of gateway devices connected to a relay network to the Internet; and
a load distribution management device configured to operate in association with the plurality of load distribution packet transfer devices,
wherein each of said load distribution packet transfer devices includes:
a plurality of line interfaces each configured to accommodate a connection line with the user terminals or the gateway devices; and
a protocol processing unit configured to control transfer of user packets and communication control packets between line interfaces respectively configured to accommodate a connection between a user terminal and a gateway device,
wherein said protocol processing unit is configured to perform the functions of:
transferring a connection start request packet received from one of the user terminals requesting to start a connection to the relay network, to the plurality of gateway devices;
extracting gateway identification information from each response packet received within a predetermined time period, adding the gateway identification information to a connection manage table, and notifying the load distribution management device of a selection request including the gateway identification information, when the protocol processing unit has received a response packet in response to the connection start request packet from the gateway device;
transferring a response packet from the load distribution management device to the requesting one of the user terminals, when the protocol processing unit has received the response packet which includes a selected gateway identification information, from the load distribution management device; and
thereafter transferring a user packet and a communication control packet each other between the requesting one of the user terminals and the selected gateway.

2. The packet transfer system according to claim 1, wherein said protocol processing unit is further configured to perform the function of:
upon reception of the connection start request packet, register a new table entry including identification information of the user terminal extracted from a header of the connection request packet, to a connection management table.

3. The packet transfer system according to claim 2, wherein said protocol processing unit is further configured to record gateway device information extracted from a header of the response packet, to the connection management table.

4. The packet transfer system according to claim 3, wherein said protocol processing unit includes:
a routing unit connected to the plurality of line interfaces; and
a control processor coupled to the routing unit,
wherein said routing unit includes a monitoring packet table indicating a type of a communication control packet to be monitored, and
wherein said routing unit is configured to perform the functions of:
transferring a communication control packet specified in the monitoring packet table, of the communication control packets received from the line interfaces, to the control processor; and
routing a communication control packet that is not specified in the monitoring packet table, to one of the line interfaces according to the header information of the packet.

5. The packet transfer system according to claim 2, wherein said protocol processing unit includes:
a routing unit connected to the plurality of line interfaces; and
a control processor coupled to the routing unit,
wherein said routing unit includes a monitoring packet table indicating a type of a communication control packet to be monitored, and
wherein said routing unit is configured to perform the functions of:
transferring a communication control packet specified in the monitoring packet table, of the communication control packets received from the line interfaces, to the control processor; and
routing a communication control packet that is not specified in the monitoring packet table, to one of the line interfaces according to the header information of the packet.

6. The packet transfer system according to claim 1, wherein said protocol processing unit includes:
a routing unit connected to the plurality of line interfaces; and
a control processor coupled to the routing unit,
wherein said routing unit includes a monitoring packet table indicating a type of a communication control packet to be monitored, and
wherein said routing unit is configured to perform the functions of:
transferring a communication control packet specified in the monitoring packet table, of the communication control packets received from the line interfaces, to the control processor; and
routing a communication control packet that is not specified in the monitoring packet table, to one of the line interfaces according to the header information of the packet.

7. A packet transfer system comprising:
a plurality of load distribution packet transfer devices provided among a plurality of user terminals and a plurality of gateway devices connected to a relay network to the Internet; and
a load distribution management device configured to operate in association with the plurality of load distribution packet transfer devices, wherein said load distribution management device includes:

a line interface configured to accommodate a connection line with the load distribution packet transfer devices; and a load distribution processing unit configured to provide load distribution control of the gateway devices, which stores a load distribution management table for storing priority information of each of gateway devices, wherein said load distribution management device is configured to perform the functions of:

extracting a plurality of gateway identification information from a gateway information list notification received from the load distribution packet transfer devices;

selecting a high priority gateway device based on a comparison between extracted gateway identification information and priorities of the load distribution management table; and providing selected gateway device information to the load distribution packet transfer device, wherein said gateway information list notification is a list for identifying gateway devices which send response packets within a predetermined period of time, when one of the load distribution packet transfer devices receives response packets from the plurality of the gateway devices within the predetermined period of time, in response to the connection start request from one of the user terminals.

8. The packet transfer system according to claim 7, wherein, said load distribution processing unit is further configured to perform the functions of:

upon reception of the gateway information list notification, searching information of each gateway device registered in the gateway information list notification, from gateway device information registered in table entries of the load distribution management table from the highest connection priority;

updating the number of connections of the corresponding gateway device and its connection rate that are indicated in the load distribution management table;

determining a new selection priority for each of the gateway devices, based on the connection rate of the corresponding gateway device and another connection rate in the updated table;

registering the determined selection priorities to the load distribution management table; and selecting a new selected gateway device corresponding to a new connection start request packet, based on the selection priority of each of gateway selectors indicated in the load distribution management table.

9. The packet transfer system according to claim 8, wherein said load distribution management table further includes operational priority indicating an operation mode for each of the gateway devices, and wherein said load distribution processing unit is further configured to select the selected gateway device from the gateway devices with a first operational priority.

10. The packet transfer system according to claim 7, wherein said load distribution management table further includes operational priority indicating an operation mode for each of the gateway devices, and wherein said load distribution processing unit is further configured to select the selected gateway device from the gateway devices with a first operational priority.

* * * * *